United States Patent
Beauchemin

(12) 
(10) Patent No.: US 6,207,741 B1
(45) Date of Patent: Mar. 27, 2001

(54) THIN FLAME RESISTANT SOLID SURFACE MATERIAL

(75) Inventor: Paul E. Beauchemin, East Aurora, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/491,640

(22) Filed: Jan. 27, 2000

(51) Int. Cl.⁷ ................. C08K 3/16; C08K 3/22
(52) U.S. Cl. ......................... 524/412; 524/436
(58) Field of Search ................... 524/412, 436

(56) References Cited

U.S. PATENT DOCUMENTS

| | | |
|---|---|---|
| 3,361,705 * | 1/1968 | Kay . |
| 3,816,367 * | 6/1974 | Larkin et al. . |
| 4,067,847 * | 1/1978 | Yui et al. . |
| 4,243,579 * | 1/1981 | Keogh . |
| 4,740,537 * | 4/1988 | Silver .................................. 524/414 |
| 4,764,539 * | 8/1988 | Ladang .................................. 106/122 |
| 5,036,121 * | 7/1991 | Coaker et al. ....................... 524/412 |
| 5,670,748 * | 9/1997 | Singue et al. ..................... 174/120 R |

FOREIGN PATENT DOCUMENTS

| | | |
|---|---|---|
| 0244866 * | 11/1987 | (EP) . |
| 0364717 * | 4/1990 | (EP) . |
| 2-32114 * | 2/1990 | (JP) . |
| 6-80811 * | 3/1994 | (JP) . |
| 7-228775 * | 8/1995 | (JP) . |
| 11172101A * | 6/1999 | (JP) . |
| 95/18178 * | 7/1995 | (WO) . |

* cited by examiner

*Primary Examiner*—Margaret Medley

(57) ABSTRACT

Thin flame resistant solid surface material is provided from compositions containing an acrylic polymer matrix having dispersed therein controlled amounts of magnesium hydroxide as filler, antimony oxide and a brominated flame retardant.

2 Claims, No Drawings

THIN FLAME RESISTANT SOLID SURFACE MATERIAL

BACKGROUND OF THE INVENTION

1. Field of the Invention

This invention relates to a flame resistant thermoplastic acrylic composition comprising an acrylic polymer matrix, filler and a combination of flame retardant materials. The material is in thin solid surface form which when subjected to a flame is self-extinguishing and generates a minimum amount of smoke.

2. Description of the Prior Art

In developing flame retardant polymeric compositions it is known, as disclosed in U.S. Pat. No. 4,243,579, to use combinations of halogen-containing compounds and antimony oxide to impart flame retardant properties. However, there are several disadvantages in the use of such combinations, which include dense smoke production on burning, and the existence of afterglow on burning. ASTM E-84 specifies a standard test method for surface burning characteristics of building materials. The test results cover two parameters; flame spread and smoke developed during a 10-minute fire exposure. Inorganic cement board and red oak flooring are used as comparative standards and their responses are assigned arbitrary values of 0 and 100 respectively. The classifications are as follows for interior wall and ceilings.

| ASTME E-84 TEST CLASSIFICATIONS | | |
|---|---|---|
| Class | Flame Spread | Smoke Developed |
| I | 0–25 | 0–450 |
| II | 26–75 | 0–450 |
| III | 76–200 | 0–450 |

While thick sheets of known solid surface materials may meet Class I standards, sheets having a thickness of less than about 0.25 inch (0.635 cm) have not met the Class I standard. Accordingly, there is a need to provide new compositions, which meet the ASTM E-84 Class I test.

Summary of the Invention

It has been found that Class I ASTM E-84 test standards are met by providing thin solid surface materials from thermoplastic compositions containing an acrylic polymer matrix having dispersed therein controlled amounts of magnesium hydroxide as the filler, and antimony oxide and a brominated flame retardant.

Description of the Preferred Embodiments

Preferred embodiments of the acrylic resin based compositions contain from about 45% to 65% by weight based on the total weight of the composition of magnesium hydroxide, from 0.15% to 15% by weight of antimony oxide, and 5% to 20% by weight of a halogenated flame retardant.

The antimony hydroxide may be selected from any of tri-, tetra-, penta-antimony oxide or combinations thereof. The halogenated flame retardant is selected from brominated compounds such as tetradecabromophenoxybenzene, pentabromodiphenyl ether, octabromodiphenyl ether, decabromodiphenyl ether, tetrabromobisphenol A and its derivatives, tribromoneopentyl alcohol, hexabromocyclododecane, tribromophenyl allyl ether, tetrabromodipentaerythritol, bis (tribromophenoxy)ethane, ethylene bis(dibromonorbomane) dicarboximide, tetrabromobispenol S, bis(2,3-dibromopropyl)ether, and poly (pentabromobenzyl) acrylate. These flame retardants are commercially available.

The acrylic resins useful in the present invention are commercially available thermoplastic resins that can be formed into high performance decorative solid surface material. A particularly good and especially preferred resin which meets all of the above properties is poly(methyl methacrylate).

As used herein, the term "thermoplastic" refers to polymers that are reversibly deformable (able to be softened) after being heated above their softening or glass transition temperatures and then cooled. These materials are capable of being repeatedly melt processed in plastic manufacturing machinery. As is generally accepted by those skilled in the art, thermplastic polymers include polymethacrylates and methyl methacrylates such as $C_2$–$C_{22}$ alkyl(meth) acrylate monomers. More particularly, the thermoplastic matrix material may be an impact modified polymethacrylate. Suitable impact modifiers include, for example, elastomeric polymers such as graft polymers of methyl methacrylate and styrene or butadiene, copolymers of butyl acrylate and methyl acrylaste or other well known impact modifiers present in amounts from 0 to 25 weight percent.

The presence of significant amounts of fillers other than magnesium hydroxide detract from the adventitious flame retardant attributes of the products of this invention. Accordingly, the products of this invention should be substantially free of such fillers.

It is permissable to include in the products of this invention controlled amounts of additives such as pigmnents, dyes, parting agents, fluidizing agents, viscosity control agents, curing agents, antioxidants, and the like as are known to those of ordinary skill in the art in amounts that do not detract from the flame retardant attributes of the products of this invention.

The solid surface material maintains its pleasing aesthetics, is easy to maintain and provides excellent flame retardance in a variety of end uses such as bathroom wet walls, wall partitions or wall cladding.

The following examples in which parts and percentages are by weight unless otherwise specified further illustrate products of the present invention. All samples have a thickness of 0.125 in.( 0.3175 cm.)

EXAMPLES

Example 1

A sample of the following composition was compounded on a W&P twin-screw extruder 50% magnesium hydroxide filler, 12% tetradecebromophenoxybenzene flame retardant obtained from the Albemarle Co., sold under the tradename "Saytex"

3% antimony oxide,

35% PMMA acrylic pellets obtained from AtoChem

The material was then re-extruded on a single screw extruder through a sheet die to make a 24 inch wide sheet (60.96 cm) for testing in accordance with the ASTM E-84 test.

In testing it was found that the sheet had the following properties meeting Class 1 standards of ASTM E-84:

Flame spread 20

Smoke generation 100

The flame was self-extinguishing and smoke generation was low.

The sheet was useful as a solid surface material for walls and ceilings.

Example 2

The following composition was compounded on A Buss kneader:

55% magnesium hydroxide

2% antimony oxide

8% tetradecabromophenoxybenzene

35% PMMA acrylic pellets obtained from AtoChem

The material was reextruded on a single screw machine with a 2 inch sheet (5.08 cm) die and tested in an ASTM E-84 flame tunnel. It met the Class I standards of ASTM E-84. The flame was self-extinguishing and smoke generation was low.

Flame spread 25

Smoke generated 105

Example 3 (Comparative Example)

Material having the following composition was compounded on a twinscrew extruder as above:

60% magnesium hydroxide

40% PMMA

Again the material was made into sheets with the the following results:

Flame 85

Smoke 5

The sheets had an ASTM E-84 Class II rating. They did not meet Class 1 standards thus showing the need for the halogenated flame retardants to slow flame spread.

Example 4 (Comparative Example)

Example 2 was repeated with the following composition being extruded on a Buss kneader:

35% magnesium hydroxide

3% antimony oxide

12% tetradecabromophenoxybenzene

50% PMMA

Sheets prepared from the material had a Class III ASTM E-84 rating.

Flame spread 80

Smoke 290

The material did not contain the minimum level of magnesium hydroxide needed to keep flame spread low.

Example 5 (Comparative Example)

Example 1 was repeated with the following composition being extruded on a twin-screw extruder:

13% calcium carbonate.

20% tetradecabromophenoxybenzene

5% antimony oxide

62% PMMA

After forming the above composition into sheets, an ASTM E84 rating of Class II resulted. The flame spread index was 75, and the smoke index was 475. No magnesium hydroxide was present in the composition.

What is claimed is:

1. A flame retardant composition comprising a thermoplastic acrylic resin matrix having dispersed therein magnesium hydroxide in an amount from 45% to 65% by weight based on the total weight of the flame retardant composition, from 0.15% to 15% by weight antimony oxide and from 5% to 20% by weight of tetradecabromophenoxybenzene as a flame retardant, and wherein the acrylic resin matrix is selected from the group consisting of polymethacrylate and methylmethacrylate.

2. The composition of claim 1 in the form of a self-extinguishing solid surface material having a thickness of less than 0.25 inch, (0.635 cm), said material meeting the ASTM E-84, Class I flame and smoke rating requirements.

\* \* \* \* \*